United States Patent [19]

Martin et al.

[11] 4,174,642
[45] Nov. 20, 1979

[54] CHAIN DRIVE INCLUDING SPROCKET HAVING ALTERNATE WIDE AND NARROW TEETH

[75] Inventors: Virgil B. Martin, West Bend; Roger L. Villers, Waubeka, both of Wis.

[73] Assignee: Gehl Company, West Bend, Wis.

[21] Appl. No.: 876,251

[22] Filed: Feb. 9, 1978

[51] Int. Cl.² .................. F16H 55/30; F16G 13/02
[52] U.S. Cl. ............................. 74/243 R; 74/245 R
[58] Field of Search ......... 74/243 R, 245 R, 245 LP, 74/250 R, 250 S, 245 S

[56] References Cited

U.S. PATENT DOCUMENTS

| 257,445 | 5/1882 | Lechner | 74/243 R |
|---|---|---|---|
| 536,813 | 4/1895 | MacPhail et al. | 74/243 R |
| 586,991 | 7/1897 | Curley | 74/243 R |
| 590,649 | 9/1897 | Ribyn, Jr. | 74/243 R |
| 591,270 | 10/1897 | Gauthier | 74/243 R |
| 2,602,343 | 7/1952 | Barrett et al. | 74/243 R |
| 3,969,947 | 7/1976 | Martin et al. | 74/243 R |

*Primary Examiner*—Samuel Scott
*Assistant Examiner*—William R. Henderson
*Attorney, Agent, or Firm*—James E. Nilles

[57] ABSTRACT

A chain drive includes a sprocket rotatable in a plane and comprising an even number of wide and narrow tapered teeth and a flexible chain comprising successive links having alternate wide and narrow tooth-engaging link openings, with tooth width and link-opening width being measured in a direction transverse to the plane of sprocket rotation. The arrangement ensures proper registration and engagement of the link opening of each oncoming link with a tooth of appropriate width despite displacement of the oncoming chain flight from the plane of sprocket rotation and thereby prevents disengagement of a loose chain from the sprocket or breakage of a tight chain by the sprocket.

2 Claims, 10 Drawing Figures

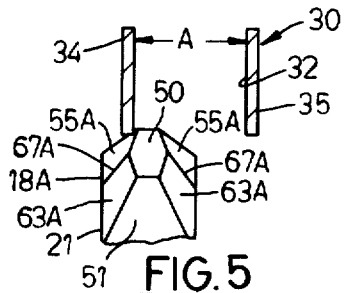
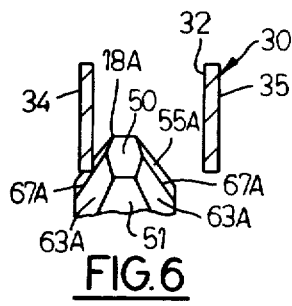
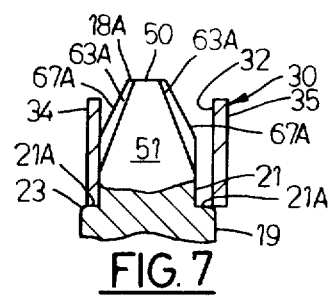
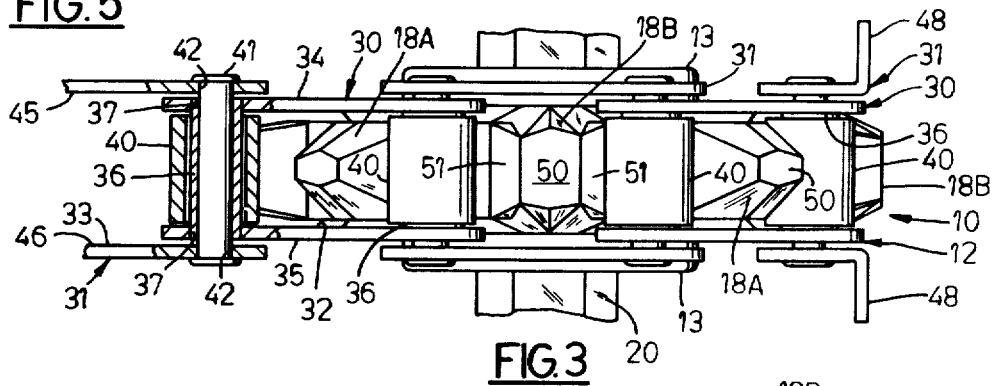
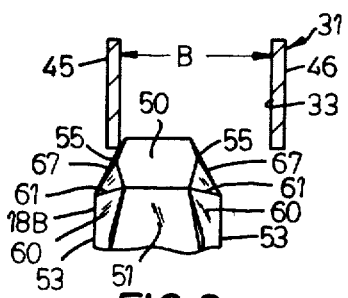
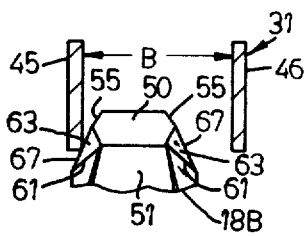
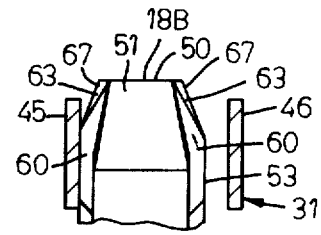
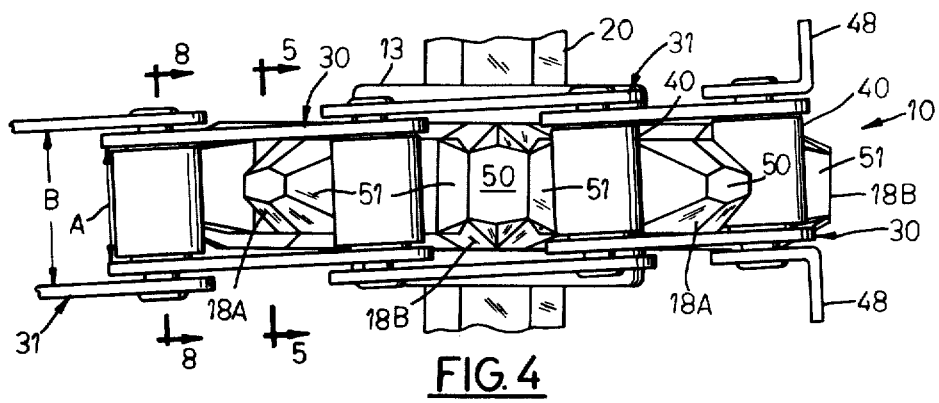

CHAIN DRIVE INCLUDING SPROCKET HAVING ALTERNATE WIDE AND NARROW TEETH

BACKGROUND OF THE INVENTION

1. Field of Use

This invention relates generally to chain drives including sprockets and flexible chains employed therewith and, in particular, to the configuration and arrangement of the sprocket teeth.

2. Description of the Prior Art

Some chain drives, such as are used in agricultural machinery or the like, employ a drive sprocket and a driven sprocket, both rotatable in a common plane about their respective axes, and connected by an endless flexible single strand roller chain wherein both chain flights move in the said common plane transverse to the sprocket axes. Such chains sometimes comprise alternately arranged articulatable roller links and pin links, with each link comprising a pair of laterally spaced apart link members or plates defining a tooth-engaging link opening therebetween. Typically, the spacing between the pin link plates in each pin link (measured in a direction transverse to the aforesaid common plane) is greater than that between the roller link plates in each roller link thereby resulting in alternate wide and narrow links and link openings. In such an arrangement, using a conventional tapered tooth sprocket wherein sprocket teeth are all of the same width (measured in a direction transverse to the aforesaid common plane), if the oncoming chain flight is deflected or displaced from the aforesaid common plane for some reason, there is usually some initial misalignment and interference between each advancing sprocket tooth and the oncoming chain link with which it must engage. More specifically, many such chains, especially those equipped with attachment links as in agricultural machinery whereby conveyor mechanisms are attached to the chains, may have loads applied to them in a direction perpendicular to the aforesaid common plane in which the chain lies and moves. Unless the chain is kept quite taut, a displacement of the chain out of the plane of the sprocket will occur. Depending upon the looseness of the chain and the difference between the sprocket tooth width and the distance (width) between the roller link plates, the chain can often deflect enough to cause the tip of a tooth entering a chain link opening to meet the edge of a roller link plate, no matter how thin the link edge might be, rather than feeding into the space or opening between the link plates. This action then causes the chain to attempt to ride along the outside diameter of the sprocket. Generally, this cannot occur and, if loose, the chain will climb completely off of the sprocket or, if taut, be broken in two.

SUMMARY OF THE PRESENT INVENTION

In accordance with the invention, there is provided a sprocket rotatable in a plane about an axis and comprising an even number of wide and narrow tapered teeth and a flexible chain having a portion engaged with the sprocket and an oncoming flight portion. The chain comprises successive links having alternate wide and narrow tooth-engaging link openings, with tooth width and link-opening width being measured in a direction transverse to the plane of sprocket rotation. Thus, in a roller chain which comprises roller links and pin links, each link comprises laterally spaced apart link plates and the spacing between the pin link plates in each pin link is greater (wider) than that between the roller link plates in each roller link. The sprocket, which has an even number of teeth and wherein adjacent teeth differ in thickness, one being wide and one being narrow, is associated with the chain so that each wide tooth engages a wide opening of a pin link and each narrow tooth engages a narrow opening of a roller link. Each sprocket tooth, whether wide or narrow, is tapered to facilitate initial registration and engagement thereof with a link opening. The arrangement ensures proper registration and engagement of the link opening of each oncoming link with a tooth of appropriate width despite displacement of the oncoming chain flight from the plane of sprocket rotation and thereby prevents disengagement of a loose chain from the sprocket or breakage of a tight chain by the sprocket. By making every other tooth wider than the narrow width required to fit in between only the narrow roller link opening, the chain is also supported by the teeth engaged in the pin link opening. This additional support reduces the possible deflection of the chain out of the sprocket plane by at least half of what it would be with all the teeth of the same thickness and, indeed, with quite reasonable tolerances applied to the sprocket teeth, completely prevents it from producing link plate-to-tooth-tip contact, regardless of the displacing force or the looseness of the chain.

A sprocket in accordance with the invention, which can be economically fabricated by casting, forging or machining, eliminates chain slippage off the sprocket, reduces the risk of chain breakage caused by the sprocket, reduces chain and sprocket tooth wear, and reduces chain noise during operation. Other objects and advantages of the invention will hereinafter appear.

BRIEF DESCRIPTION OF THE DRAWINGS

FIG. 3 is a top plan view of the sprocket and chain shown in FIG. 1 with no side load imposed on the chain;

FIG. 4 is a plan view similar to FIG. 3 but showing a load imposed on the chain and causing the oncoming flight to be displaced from the plane of sprocket rotation;

FIG. 5 is an elevational view partly in section, taken on line 5—5 of FIG. 4 and showing a narrow sprocket tooth entering the narrow link opening and making initial engagement with the inside of one roller link plate of a narrow roller link of the chain;

FIGS. 6 and 7 are views similar to FIG. 5 and showing further stages of engagement of the narrow tooth with the roller link and deflecting the same;

FIG. 8 is an elevational view, partly in section, taken on line 8—8 of FIG. 4 and showing a wide sprocket tooth entering the wide link opening and making initial engagement with the inside of one pin link plate of a wide pin link of the chain; and FIGS. 9 and 10 are views similar to FIG. 8 and showing the further stages of engagement of the wide tooth with the pin link and deflecting the same.

DESCRIPTION OF A PREFERRED EMBODIMENT

Figure 1:
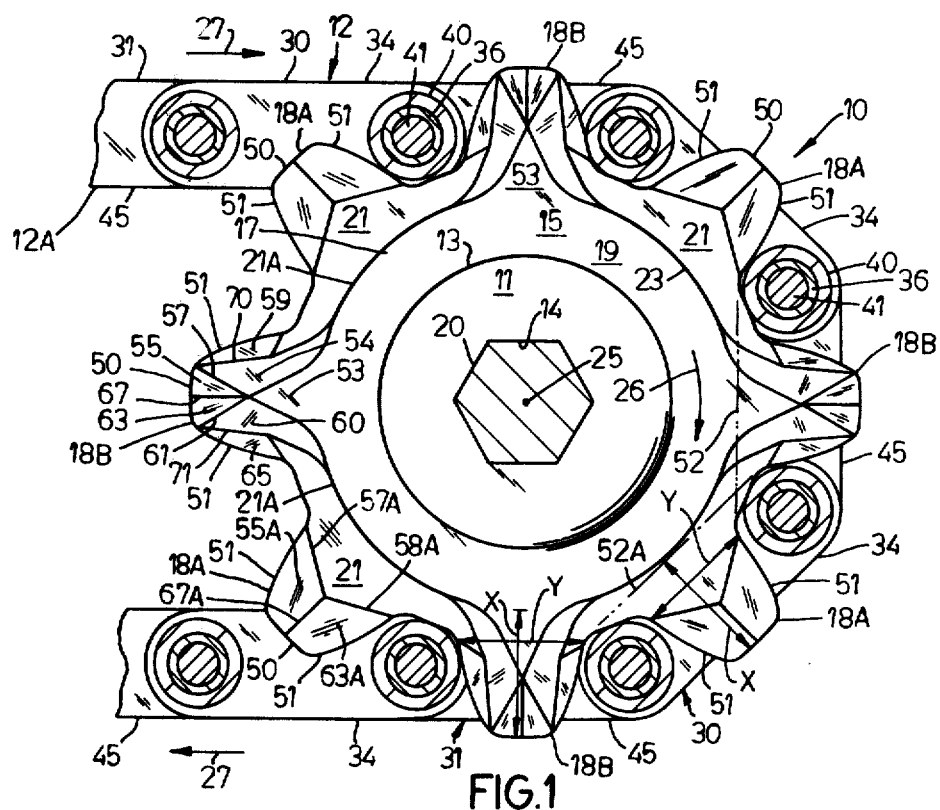
FIG. 1 is a side elevational view, partly in section, of a sprocket having teeth in accordance with the invention and shown in engagement with a flexible roller chain.

FIG. 1 shows a portion of a chain drive embodying the invention and comprising a sprocket 10, which may be a drive sprocket or a driven sprocket, depending on requirements, and a portion of a flexible single strand roller chain 12. Sprocket 10, which may be fabricated by casting or machining from ductile iron or Pearlitic malleable iron or other suitable material, and which is rotatable about an axis 25 in a plane normal to the axis, comprises a body 11, including a central hub 13 having a shaft hole 14 therethrough; a radially outwardly extending portion 15; and an even number of (eight) equidistantly angularly spaced apart radially outwardly extending tapered sprocket teeth, including four relatively narrow teeth 18A alternately arranged with four relatively wide teeth 18B, which extend radially outwardly from the perimeter of portion 15. Sprocket 10 is mounted on and rotatable with a hexagonal shaft 20 which extends through shaft hole 14, being secured against axial displacement on the shaft by any suitable means, such as a set screw 22.

Sprocket 10 has oppositely disposed spaced apart sides 16 and 17 which are identical with but mirror images of each other. Side 17 of sprocket 10 includes a flat or planar main surface 19 and a plurality of (four) discrete flat step surfaces 21, each bounded on its inboard side by a shoulder 21A. Main surface 19 merges with one side of each wide tooth 18B near the root thereof. Each step surface 21 merges with one side of a narrow tooth 18A near the root thereof.

For purposes of discussion and orientation regarding the shape of each tooth 18A and 18B, each tooth has a height (dimension X in FIG. 1), a length (dimension Y in FIG. 1), a width or thickness (dimension Z in FIG. 2), a generally flat crest 50, a curved surface 51 at the front (leading) and rear (trailing) surfaces thereof defined by the face, flank, and fillet of the tooth, and a root portion whereat it joins body portion 15 of sprocket 10.

Figure 2:
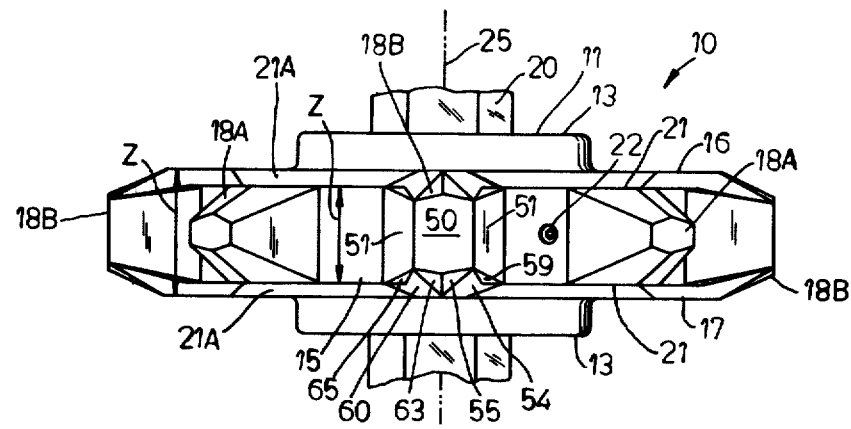
FIG. 2 is a top plan view of the sprocket shown in FIG. 1 with chain removed.

Thus, as FIGS. 1 and 2 show, the teeth 18A and 18B are all of the same height X and the same length Y and have similarly shaped curved surfaces 51 but differ from each other in width Z, in the size and shape of crest 50 and in taper, as hereinafter explained, with each tooth 18A being narrower (dimension Z) than each tooth 18B. The teeth 18A and 18B are engageable with roller links 30 and pin links 31, respectively, of chain 12.

As FIGS. 1, 3, and 4 show, chain 12 comprises a plurality of articulatable alternately arranged and interconnected roller links 30 and pin links 31 and has a portion in engagement with sprocket 10 and an oncoming flight 12A, assuming rotation of the sprocket in the direction of arrow 26 and movement of the chain in the direction of the arrows 27 in FIG. 1. FIG. 3 shows chain 12 located and moving in the same plane as that in which sprocket 10 rotates. FIG. 4 shows chain 12 displaced from and at an angle to the plane of rotation of sprocket 10 as a result, for example, of a load applied to the chain in a direction transverse to the direction of chain movement as by components attached thereto.

The links 30 and 31 are narrow and wide links, respectively, and have narrow and wide tooth-engagement or receiving link openings 32 and 33, respectively, therein, with the width of a link opening being measured in a direction transverse to the plane of rotation of sprocket 10 and being defined by laterally spaced apart link members or plates. As FIGS. 1 and 3 show, each roller link 30 comprises a pair of vertically spaced apart flat roller link plates 34 and 35, respectively, and these plates are rigidly interconnected at their opposite ends by hollow cylindrical bushings 36 which are secured in holes 37 in the roller link plates. A hollow cylindrical chain roller 40 is disposed around and rotatable on each bushing 36. A pin 41 extends through and is oscillatable within each bushing 36. The ends of each pin 41 extend through holes 42 in the ends of a pair of vertically spaced apart pin link plates 45 and 46, respectively, and are rigidly secured thereto by upsetting or peening. The pin link plates 45 and 46 of each pin link 31 have a flat portion and may be provided with an angularly offset flange 48 for the attachment of components to be moved by the chain 12. As FIG. 3 shows, the spacing between the pin link plates 45 and 46, which distance or spacing is designated B, and is greater than the distance between the roller link plates 34 and 35, which distance is designated A.

As FIGS. 1 and 2 best show, the opposite sides 16 and 17 of sprocket 10, which are spaced apart the distance (width) Z hereinbefore referred to, are symmetrical and are mirror images of each other and, therefore, only side 17 will hereinafter be described in detail as regards the shapes of the associated sides of the teeth 18A and 18B defining the widths and tapers thereof.

As regards each wide tooth 18B, surface 19 terminates in a flat level portion 53 bounded on its inbound side by an imaginary line 52 which corresponds, for example, to the inboard edge of a pin link plate 45 when a pin link 31 is fully engaged with a tooth 18B of the sprocket (see FIG. 1). Portion 53 merges with each wide tooth 18B and defines a first lateral side thereof. Portion 53 is bounded on its outboard side by two level intersecting curved lines 23, which also define the inboard edges of the first oppositely sloped surfaces 54 and 60 of tooth 18B. Thus, portion 53 forms or defines a relatively large surface area for load-bearing engagement with the inside surface of a pin link plate 45, as FIGS. 1 and 10 show. The distance Z between the two oppositely spaced apart side portions 53 of a tooth 18B is the effective width of the tooth 18B and, as FIG. 3 shows, is slightly less than the width B of a wide link opening 33. The hereinafter defined sloped surfaces of a tooth 18B cooperate to provide the taper of the tooth which facilitates its proper registration and engagement with a pin link 31 during operation of the chain drive, as FIGS. 8, 9, and 10 show. The first sloped surfaces 54 and 60 of a tooth 18B slope away from axis 25 toward the opposite side 16 of sprocket 10, and away from each other. The first sloped surfaces 54 and 60 are associated with second sloped surfaces 55 and 63, respectively, intersecting therewith at lines 57 and 61, respectively, and with third sloped surfaces 59 and 65, respectively, of a tooth 18B. The second surfaces 55 and 63 intersect each other and slope away from each other along a line 67 which intersects with and slopes away from the intersection point of the curved lines 23. The second surfaces 55 and 63 also slope away from axis 25 and towards the opposite side 16 of sprocket 10. The third surfaces 59 and 65 intersect with and slope away from the second surfaces 55 and 63, respectively, along lines 70 and 71, respectively. The third surfaces 59 and 65 also slope away from axis 25 and toward opposite side 16 of sprocket 10.

Sloped surface 60, 63, and 65 are usable or come into play only when sprocket 10 is rotating in a direction opposite to arrow 26.

The opposite side of a tooth 18B comes into play when chain 12 is displaced in a direction opposite to that shown in FIGS. 4–7 or when sprocket 10 is reversely disposed from the position shown in the drawing.

As regards each narrow tooth 18A, each step surface 21 on side 17 of sprocket 10 is bounded by a curved shoulder 21A. Each step surface 21 is associated with and merges into sloped surfaces 55A and 63A along straight lines 57A and 58A, respectively. The second sloped surfaces 55A and 63A intersect each other and slope away from each other along a line 67A which intersects with and slopes away from the intersection point of the lines 57A and 58A. The radially outermost portion of step surface 21 is bounded on its inboard side by an imaginary line 52A which corresponds, for example, to the inboard edge of a roller link plate 34 when a roller link 30 is fully engaged with a tooth 18A of the sprocket 10 (see FIG. 1). Line 52A overlies the widest portion of a tooth 18A. The distance Z between two spaced apart lines 52A of a tooth 18A is the effective width of a tooth 18A and this distance is substantially narrower than the width of a tooth 18B and, as FIG. 3 shows, is slightly less than the width A of a narrow link opening 31.

Sprocket 10 and chain 12 cooperate as follows in accordance with the invention. As FIGS. 1 and 4–10 make clear, when a sprocket tooth approaches the inner side of an oncoming link in a displaced oncoming chain flight, the sloped surfaces defining the taper of a tooth enable the tooth to enter the link opening between the link plates and bear against the inside of the displaced link plate. As sprocket 10 continues to rotate, the sloped tooth surfaces make contact with the edge of the link plate and cause it to ride thereagainst and gradually be shifted toward the plane of rotation of the sprocket. In this manner, initial contact between a tooth and a link is controlled and the link is gradually shifted from a displaced position to a position wherein it is fully engaged with sprocket 10 and supported substantially in the same plane as the sprocket.

As will be understood, the components forming chain 12 are relatively loosely connected and may assume slightly different relative positions as the links advance into engagement with the sprocket 10. Thus, it is conceivable in some instances that the edge of a link plate may make its initial contact directly with different edges or sloped surfaces of a tooth. Nevertheless, the end result during cooperation of the sloped surfaces and edges and the link plates is to improve and control initial contact between the sprocket teeth and links, thereby aiding in preventing misregistration or misalignment of the chain and sprocket. Furthermore, the arrangement of alternate wide and narrow teeth on the sprocket and cooperating alternate wide and narrow link openings in the chain links ensure proper registration and engagement of the link opening of each oncoming link with a tooth of appropriate width despite displacement from the plane of sprocket rotation and thereby prevent disengagement of a loose chain from the sprocket or breakage of a tight chain by the sprocket.

It is to be understood that, although a flexible roller chain is disclosed in the preferred embodiment, other types of flexible chains having alternate wide and narrow link openings could be employed in a chain drive and with a sprocket in accordance with the invention.

We claim:

1. In a chain drive, in combination: a sprocket rotatable in a plane about an axis and a flexible chain having a portion engaged with said sprocket and an oncoming flight portion; said chain comprising interconnected links, each link comprising a pair of link plates spaced apart from each other by a predetermined distance in a direction along said axis to define a link opening, with the link plates in adjacent links being spaced apart different predetermined distances and with the plates in every other link being spaced apart the same predetermined distance to provide alternate wide and narrow link openings; said sprocket comprising a body portion having opposite sides of a periphery and having an even number of tapered teeth extending radially outward from said periphery relative to said axis in a plane normal to said axis, each tooth having a length measured in a direction transverse to said axis and having a width measured in a direction along said axis, with adjacent teeth being of different widths relative to each other and with every other tooth being of substantially the same width to provide wide and narrow teeth for engagement with said wide and narrow link openings, respectively, said teeth cooperating with the links in said oncoming flight portion to effect alignment of said chain with said sprocket, each opposite side of said body portion comprising a main surface and a plurality of stepped surfaces spaced apart from each other around the body near the periphery thereof, each side tooth having a side surface near the root thereof defined by a portion of said main surface for load-bearing engagement with the inside surface of a link plate defining a wide link opening, each narrow tooth having a side surface near the root thereof defined by a portion of one of said stepped surfaces for load-bearing engagement with the inside surface of a link plate defining a narrow link opening.

2. In a sprocket for a chain having wide and narrow links and rotatable in a plane about an axis: a body portion having opposite sides and a periphery; and even number of equidistantly spaced apart teeth extending radially outwardly from said periphery, each tooth having a width measured in a direction transverse to said plane, with adjacent teeth being of different widths and alternate teeth being of the same width whereby alternate wide and narrow teeth are provided, each opposite side of said body portion comprising a main surface and a plurality of stepped surfaces spaced apart from each other around the body near the periphery thereof, each wide tooth having a side surface near the root thereof defined by a portion of said main surface for load-bearing engagement with the inside surface of a wide link in a chain engageable with said sprocket, each narrow tooth having a side surface near the root thereof defined by a portion of one of said stepped surfaces for load-bearing engagement with the inside surface of a narrow link in a chain engageable with said sprocket, each tooth further comprising sloped surfaces which provide a taper.

* * * * *